US006035311A

United States Patent [19]

McCool et al.

[11] Patent Number: 6,035,311

[45] Date of Patent: Mar. 7, 2000

[54] METHOD AND SYSTEM FOR PERFORMING A BOOLEAN OPERATION ON BIT STRINGS USING A MAXIMAL BIT SLICE

[75] Inventors: Michael W. McCool; Jean A. Marquis, both of Pasadena, Calif.

[73] Assignee: Sand Technology Systems International, Inc., Westmount, Canada

[21] Appl. No.: 08/968,051

[22] Filed: Nov. 12, 1997

Related U.S. Application Data

[63] Continuation of application No. 08/566,005, Dec. 1, 1995, abandoned.

[51] Int. Cl.[7] ........................ G06F 7/38

[52] U.S. Cl. ........................ 708/231

[58] Field of Search ........................ 708/231, 203; 341/50, 51, 55, 95

[56] References Cited

U.S. PATENT DOCUMENTS 5,036,457 7/1991 Glasser et al. ........................ 364/200

FOREIGN PATENT DOCUMENTS

WO 89/04013 5/1989 WIPO .

*Primary Examiner*—Tan V. Mai

*Attorney, Agent, or Firm*—Christie, Parker & Hale, LLP

[57] ABSTRACT

A system and a method using a computer for performing a boolean operation on bit strings to form a resultant bit string. Each such bit string is divided into input bit slices. The resultant bit string is divided into a resultant bit slices. An action is determined according to the boolean operation based on a first such input bit slice from a first such bit string and on a second such input bit slice from a second such bit string. The input bit slice with a longer bit length is selected from between the first input bit slice and the second input bit slice. The longer input bit slice and a plurality of the input bit slices in the bit string having the input bit slice with a shorter bit length are processed according to the determined action for up to a number of bits in at least one such bit string equaling the longer bit length to form at least one such resultant bit slice.

25 Claims, 13 Drawing Sheets

FIG. 7A

ACTION FUNCTION

AND

75

70 71 73 74 72 80

| | | 0 | 0 | 1 | 1 | rB |
|---|---|---|---|---|---|---|
| rA | gA | 0 | 1 | 1 | 0 | gB |
| 0 | 0 | 0 | 0 | 1 | 0 | |
| 0 | 1 | 0 | 0 | 1 | 0 | |
| 1 | 1 | 1 | 1 | 1 | 1 | |
| 1 | 0 | 0 | 0 | 0 | 0 | |

FIG. 7B

ACTION FUNCTION

OR

75

70 71 73 74 72 81

| | | 0 | 0 | 1 | 1 | rB |
|---|---|---|---|---|---|---|
| rA | gA | 0 | 1 | 1 | 0 | gB |
| 0 | 0 | 0 | 0 | 0 | 1 | |
| 0 | 1 | 0 | 0 | 0 | 1 | |
| 1 | 1 | 0 | 0 | 0 | 0 | |
| 1 | 0 | 1 | 1 | 1 | 1 | |

FIG. 7C

ACTION FUNCTION

XOR

75

70 71 73 74 72 82

| | | 0 | 0 | 1 | 1 | rB |
|---|---|---|---|---|---|---|
| rA | gA | 0 | 1 | 1 | 0 | gB |
| 0 | 0 | 0 | 0 | 1 | 1 | |
| 0 | 1 | 0 | 0 | 1 | 1 | |
| 1 | 1 | 1 | 1 | 1 | 1 | |
| 1 | 0 | 1 | 1 | 1 | 1 | |

FIG. 8A

CHARACTERISTIC TYPE FUNCTION

AND

| rA (70) | gA (71) | 75 | | | |
|---|---|---|---|---|---|
| | rB (73) | 0 | 0 | 1 | 1 |
| | gB (74) | 0 | 1 | 1 | 0 |
| 0 | 0 | 0 | 1 | 1 | 1 |
| 0 | 1 | 1 | 0 | 1 | 1 |
| 1 | 1 | 1 | 1 | 1 | 1 |
| 1 | 0 | 1 | 1 | 1 | 1 |

72 (input rows); 85 (output values)

FIG. 8B

CHARACTERISTIC TYPE FUNCTION

OR

| rA (70) | gA (71) | 75 | | | |
|---|---|---|---|---|---|
| | rB (73) | 0 | 0 | 1 | 1 |
| | gB (74) | 0 | 1 | 1 | 0 |
| 0 | 0 | 0 | 1 | 1 | 1 |
| 0 | 1 | 1 | 0 | 1 | 1 |
| 1 | 1 | 1 | 1 | 1 | 1 |
| 1 | 0 | 1 | 1 | 1 | 1 |

72 (input rows); 86 (output values)

FIG. 8C

CHARACTERISTIC TYPE FUNCTION

XOR

| rA (70) | gA (71) | 75 | | | |
|---|---|---|---|---|---|
| | rB (73) | 0 | 0 | 1 | 1 |
| | gB (74) | 0 | 1 | 1 | 0 |
| 0 | 0 | 1 | 1 | 1 | 1 |
| 0 | 1 | 1 | 1 | 1 | 1 |
| 1 | 1 | 1 | 1 | 1 | 1 |
| 1 | 0 | 1 | 1 | 1 | 1 |

72 (input rows); 87 (output values)

FIG. 9A

GENDER FUNCTION

AND

75

| 70 | 71 | 0 | 0 | 1 | 1 | rB 73 |
|---|---|---|---|---|---|---|
| rA | gA | 0 | 1 | 1 | 0 | gB 74 |
| 72: 0 | 0 | 0 | 0 | 0 | 0 | 90 |
| 0 | 1 | 0 | 1 | 0 | 0 | |
| 1 | 1 | 0 | 0 | 0 | 0 | |
| 1 | 0 | 0 | 0 | 0 | 0 | |

FIG. 9B

GENDER FUNCTION

OR

75

| 70 | 71 | 0 | 0 | 1 | 1 | rB 73 |
|---|---|---|---|---|---|---|
| rA | gA | 0 | 1 | 1 | 0 | gB 74 |
| 72: 0 | 0 | 0 | 1 | 1 | 0 | 91 |
| 0 | 1 | 1 | 1 | 1 | 0 | |
| 1 | 1 | 1 | 1 | 1 | 1 | |
| 1 | 0 | 0 | 0 | 0 | 0 | |

FIG. 9C

GENDER FUNCTION

XOR

75

| 70 | 71 | 0 | 0 | 1 | 1 | rB 73 |
|---|---|---|---|---|---|---|
| rA | gA | 0 | 1 | 1 | 0 | gB 74 |
| 72: 0 | 0 | 0 | 1 | 1 | 0 | 92 |
| 0 | 1 | 1 | 0 | 1 | 0 | |
| 1 | 1 | 1 | 1 | 1 | 1 | |
| 1 | 0 | 0 | 0 | 0 | 0 | |

FIG. 10A
TAKE FUNCTION
AND

| rA | gA | \|  | 0 | 0 | 1 | 1 | rB |
|----|----|----|---|---|---|---|----|
|    |    | \|  | 0 | 1 | 1 | 0 | gB |
| 0  | 0  | \|  | 0 | 0 | 1 | 1 |    |
| 0  | 1  | \|  | 0 | 0 | 1 | 1 |    |
| 1  | 1  | \|  | 1 | 1 | 0 | 0 |    |
| 1  | 0  | \|  | 1 | 1 | 0 | 0 |    |

FIG. 10B
TAKE FUNCTION
OR

| rA | gA | \|  | 0 | 0 | 1 | 1 | rB |
|----|----|----|---|---|---|---|----|
|    |    | \|  | 0 | 1 | 1 | 0 | gB |
| 0  | 0  | \|  | 0 | 0 | 1 | 1 |    |
| 0  | 1  | \|  | 0 | 0 | 1 | 1 |    |
| 1  | 1  | \|  | 1 | 1 | 0 | 0 |    |
| 1  | 0  | \|  | 1 | 1 | 0 | 0 |    |

FIG. 10C
TAKE FUNCTION
XOR

| rA | gA | \|  | 0 | 0 | 1 | 1 | rB |
|----|----|----|---|---|---|---|----|
|    |    | \|  | 0 | 1 | 1 | 0 | gB |
| 0  | 0  | \|  | 0 | 0 | 1 | 1 |    |
| 0  | 1  | \|  | 0 | 0 | 1 | 1 |    |
| 1  | 1  | \|  | 1 | 1 | 0 | 0 |    |
| 1  | 0  | \|  | 1 | 1 | 0 | 0 |    |

FIG. 11
FLIP FUNCTION
XOR

|  |  | rB | 0 | 0 | 1 | 1 |
|---|---|---|---|---|---|---|
| rA | gA | gB | 0 | 1 | 1 | 0 |
| 0 | 0 |  | 0 | 0 | 1 | 0 |
| 0 | 1 |  | 0 | 0 | 1 | 0 |
| 1 | 1 |  | 1 | 1 | 1 | 1 |
| 1 | 0 |  | 0 | 0 | 0 | 0 |

FIG. 12A
OUTPUT FUNCTION LOOKUP TABLE

| rA | gA | rB | gB | o | rC | gC | t | f | o | rC | gC | t | f | o | rC | gC | t | f |
|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 1 | 0 | 0 | 0 |
| 0 | 0 | 0 | 1 | 0 | 1 | 0 | 0 | 0 | 0 | 1 | 1 | 0 | 0 | 0 | 1 | 1 | 0 | 0 |
| 0 | 0 | 1 | 0 | 0 | 1 | 0 | 1 | 0 | 1 | 1 | 0 | 1 | 0 | 1 | 1 | 0 | 1 | 0 |
| 0 | 0 | 1 | 1 | 1 | 1 | 0 | 1 | 0 | 0 | 1 | 1 | 1 | 0 | 1 | 1 | 1 | 1 | 1 |
| 0 | 1 | 0 | 0 | 0 | 1 | 0 | 0 | 0 | 0 | 1 | 1 | 0 | 0 | 0 | 1 | 1 | 0 | 0 |
| 0 | 1 | 0 | 1 | 0 | 0 | 1 | 0 | 0 | 0 | 0 | 1 | 0 | 0 | 0 | 1 | 0 | 0 | 0 |
| 0 | 1 | 1 | 0 | 0 | 1 | 0 | 1 | 0 | 1 | 1 | 0 | 1 | 0 | 1 | 1 | 0 | 1 | 0 |
| 0 | 1 | 1 | 1 | 1 | 1 | 0 | 1 | 0 | 0 | 1 | 1 | 1 | 0 | 1 | 1 | 1 | 1 | 1 |
| 1 | 0 | 0 | 0 | 0 | 1 | 0 | 1 | 0 | 1 | 1 | 0 | 1 | 0 | 1 | 1 | 0 | 1 | 0 |
| 1 | 0 | 0 | 1 | 0 | 1 | 0 | 1 | 0 | 1 | 1 | 0 | 1 | 0 | 1 | 1 | 0 | 1 | 0 |
| 1 | 0 | 1 | 0 | 0 | 1 | 0 | 0 | 0 | 1 | 1 | 0 | 0 | 0 | 1 | 1 | 0 | 0 | 0 |
| 1 | 0 | 1 | 1 | 0 | 1 | 0 | 0 | 0 | 1 | 1 | 0 | 0 | 0 | 1 | 1 | 0 | 0 | 0 |
| 1 | 1 | 0 | 0 | 1 | 1 | 0 | 1 | 0 | 0 | 1 | 1 | 1 | 0 | 1 | 1 | 1 | 1 | 1 |
| 1 | 1 | 0 | 1 | 1 | 1 | 0 | 1 | 0 | 0 | 1 | 1 | 1 | 0 | 1 | 1 | 1 | 1 | 1 |
| 1 | 1 | 1 | 0 | 1 | 1 | 0 | 0 | 0 | 0 | 1 | 1 | 0 | 0 | 1 | 1 | 1 | 0 | 1 |
| 1 | 1 | 1 | 1 | 1 | 1 | 0 | 0 | 0 | 0 | 1 | 1 | 0 | 0 | 1 | 1 | 1 | 0 | 1 |

AND     OR     XOR

FIG. 12B

UNSIGNED INT     FUNCTIONS[3][16];

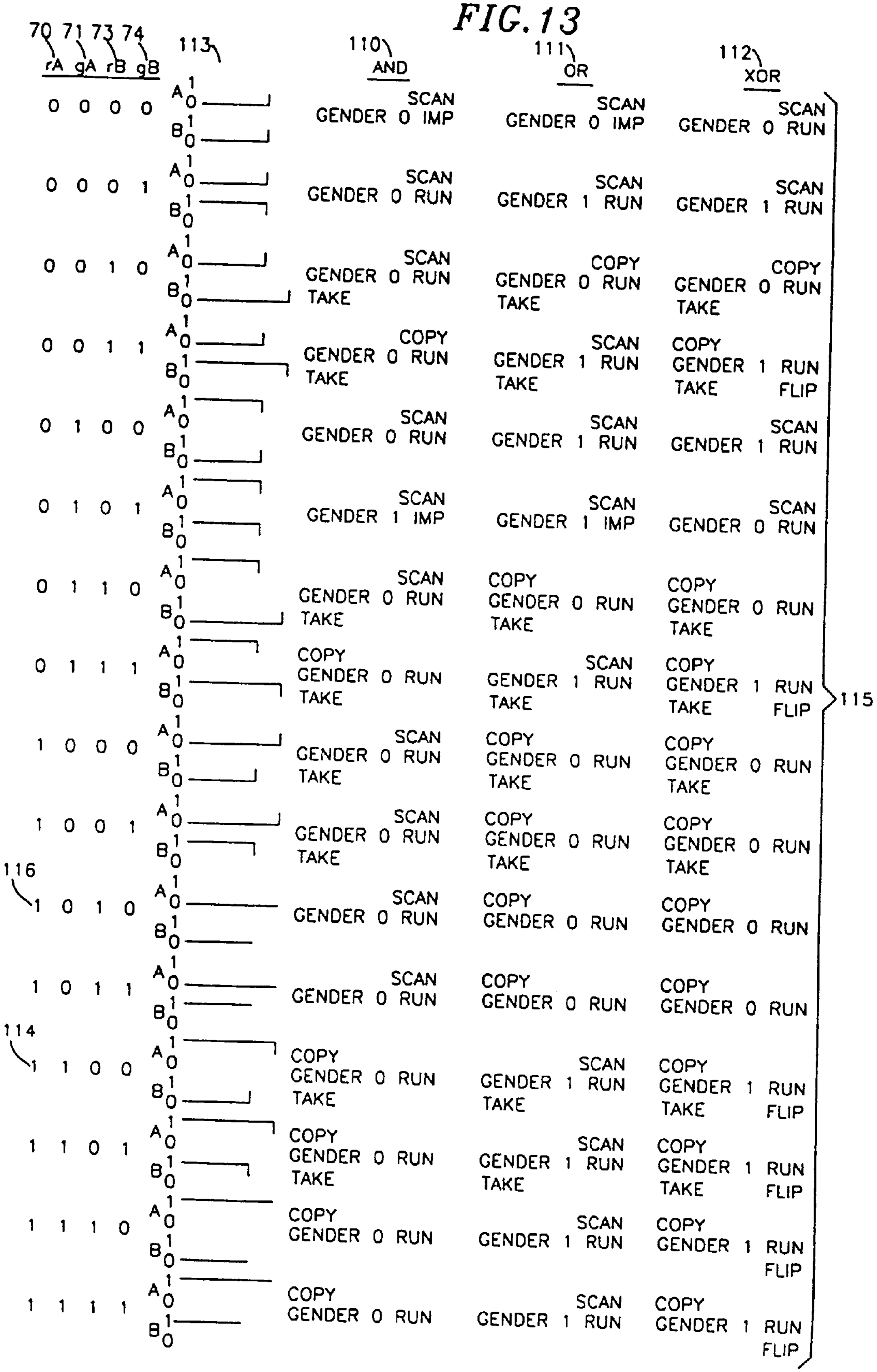

FIG. 13

| 70 71 73 74<br>rA gA rB gB | 113 | 110<br>AND | 111<br>OR | 112<br>XOR |
|---|---|---|---|---|
| 0 0 0 0 | A₀¹, B₀¹ | SCAN GENDER 0 IMP | SCAN GENDER 0 IMP | SCAN GENDER 0 RUN |
| 0 0 0 1 | A₀¹, B₀¹ | SCAN GENDER 0 RUN | SCAN GENDER 1 RUN | SCAN GENDER 1 RUN |
| 0 0 1 0 | A₀¹, B₀¹ | SCAN GENDER 0 RUN TAKE | COPY GENDER 0 RUN TAKE | COPY GENDER 0 RUN TAKE |
| 0 0 1 1 | A₀¹, B₀¹ | COPY GENDER 0 RUN TAKE | SCAN GENDER 1 RUN TAKE | COPY GENDER 1 RUN TAKE FLIP |
| 0 1 0 0 | A₀¹, B₀¹ | SCAN GENDER 0 RUN | SCAN GENDER 1 RUN | SCAN GENDER 1 RUN |
| 0 1 0 1 | A₀¹, B₀¹ | SCAN GENDER 1 IMP | SCAN GENDER 1 IMP | SCAN GENDER 0 RUN |
| 0 1 1 0 | A₀¹, B₀¹ | SCAN GENDER 0 RUN TAKE | COPY GENDER 0 RUN TAKE | COPY GENDER 0 RUN TAKE |
| 0 1 1 1 | A₀¹, B₀¹ | COPY GENDER 0 RUN TAKE | SCAN GENDER 1 RUN TAKE | COPY GENDER 1 RUN TAKE FLIP |
| 1 0 0 0 | A₀¹, B₀¹ | SCAN GENDER 0 RUN TAKE | COPY GENDER 0 RUN TAKE | COPY GENDER 0 RUN TAKE |
| 1 0 0 1 | A₀¹, B₀¹ | SCAN GENDER 0 RUN TAKE | COPY GENDER 0 RUN TAKE | COPY GENDER 0 RUN TAKE |
| 1 0 1 0 | A₀¹, B₀¹ | SCAN GENDER 0 RUN | COPY GENDER 0 RUN | COPY GENDER 0 RUN |
| 1 0 1 1 | A₀¹, B₀¹ | SCAN GENDER 0 RUN | COPY GENDER 0 RUN | COPY GENDER 0 RUN |
| 1 1 0 0 | A₀¹, B₀¹ | COPY GENDER 0 RUN TAKE | SCAN GENDER 1 RUN TAKE | COPY GENDER 1 RUN TAKE FLIP |
| 1 1 0 1 | A₀¹, B₀¹ | COPY GENDER 0 RUN TAKE | SCAN GENDER 1 RUN TAKE | COPY GENDER 1 RUN TAKE FLIP |
| 1 1 1 0 | A₀¹, B₀¹ | COPY GENDER 0 RUN | SCAN GENDER 1 RUN | COPY GENDER 1 RUN FLIP |
| 1 1 1 1 | A₀¹, B₀¹ | COPY GENDER 0 RUN | SCAN GENDER 1 RUN | COPY GENDER 1 RUN FLIP |

COPY IC BITS OF B PROCEDURE

SCAN IC BITS OF B PROCEDURE

METHOD AND SYSTEM FOR PERFORMING A BOOLEAN OPERATION ON BIT STRINGS USING A MAXIMAL BIT SLICE

RELATED APPLICATIONS

This application is a continuation of application Ser. No. 08/566,005 filed Dec. 1, 1995, now abandoned which is incorporated by reference as if set forth in full herein.

FIELD OF THE INVENTION

The present invention relates to a method and system for performing a boolean operation on bit strings, and in particular, to a method and system for performing a boolean operation on bit strings using a maximal bit slice.

BACKGROUND OF THE INVENTION

Bit strings can be used in a relational database management system ("RDBMS") to represent instances of data items occurring within records stored in the database. The conventional approach to data storage utilizes collections of tables organized into rows and columns of data Each column contains a particular type of information while each row consists of individual records of disparate information from each of the columns. Rows are contiguously stored as identically structured records. This record-oriented approach imposes large input and output (I/O) requirements, requires complex indexing schemes and demands periodic retuning and denormalization of the data.

A method for representing data in an RDBMS that substantially reduces these problems is described in International Application No. PCT/US88/03528, filed Oct. 7, 1988, the entire disclosure of which is incorporated herein by reference. The database is structured using a column-oriented approach that separates data values from their use in the database tables using bit strings. Rather than storing information as contiguous records, the data is stored in a columnar organization. The data values that make up each table are separated using bit strings that each represent a unique value in a row from each of the columns. Within each bit string, a binary bit value indicates an incidence of a columnar value within a given record (or row).

As in any RDBMS, individual data records can be located by interrogating the database using queries. A common form of a query process involves a boolean operation operating on a pair of bit strings to form a resultant bit string that represents those database records that satisfy the conditions of the query.

To save space, the bit strings can be compressed, encoded and processed according to a boolean operation as disclosed in U.S. Pat. No. 5,036,457 to Glaser et al., the entire disclosure of which is incorporated herein by reference. An uncompressed binary bit string is converted into a compressed binary bit form consisting of either a run or an impulse. A boolean operation is performed on pairs of impulses in compressed form using an iterative looping construct to form a resultant bit string. This technique is significantly faster than operating on each bit, one at a time, as is typically done in the art.

A pair of compressed impulses are obtained from a pair of encoded bit strings and the impulse with the shorter (called "minimal") length is selected. The boolean operation is performed for the number of bits in the minimal length impulse and a resultant bit string of this minimal length is formed. This cycle is repeated for each of the remaining minimal length impulses. The total number of cycles required to perform the boolean operation equals approximately the sum of the number of impulses in the two input bit strings.

The computational overhead to process bit strings with many short impulses becomes excessive, although it is not generally a problem for bit strings with many long impulses. Therefore, there is a need for a method of performing boolean operations on a pair of compressed bit strings of indeterminate length that avoids the computational overhead imposed by performing an iteration for each minimal length impulse.

SUMMARY OF THE INVENTION

The present invention improves upon the prior art by providing a method and system for performing a boolean operation on bit strings using a maximal length impulse instead of a minimal length impulse.

An embodiment of the present invention is a system and a method using a computer for performing a boolean operation on a series of bit strings to form a resultant bit string. Each such bit string is divided into input bit slices. The resultant bit string is divided into resultant bit slices. An action is determined according to the boolean operation based on a first such input bit slice from a first such bit string and on a second such input bit slice from a second such bit string. The input bit slice with a longer bit length is selected from between the first input bit slice and the second input bit slice. The longer input bit slice and a plurality of the input bit slices in the bit string having the input bit slice with a shorter bit length are processed according to the determined action for up to a number of bits in at least one such bit string equaling the longer bit length to form at least one such resultant bit slice.

Still other embodiments of the present invention will become readily apparent to those skilled in the art from the following detailed description, wherein is shown and described only embodiments of the invention byway of illustration of the best modes contemplated for carrying out the invention. As will be realized, the invention is capable of other and different embodiments and its several details are capable of modification in various obvious respects, all without departing from the spirit and scope of the present invention. Accordingly, the drawings and detailed description are to be regarded as illustrative in nature and not as restrictive.

BRIEF DESCRIPTION OF THE DRAWINGS

FIGS. 7A, 7B and 7C are Karnaugh maps of an action function respectively corresponding to boolean AND, OR and XOR operations;

FIGS. 8A, 8B and 8C are Karnaugh maps of a characteristic type function respectively corresponding to boolean AND, OR and XOR operations;

FIGS. 9A, 9B and 9C are Karnaugh maps of a gender function respectively corresponding to boolean AND, OR and XOR operations;

FIGS. 10A, 10B and 10C are Karnaugh maps of a take bit function respectively corresponding to boolean AND, OR and XOR operations;

FIG. 11 is a Karnaugh map of a flip bit function corresponding to a boolean XOR operation;

FIG. 12A is an output function lookup table respectively of the merged action, characteristic type, gender, take bit and flip functions of FIGS. 7A, 7B, 7C, 8A, 8B, 8C, 9A, 9B, 9C, 10A, 10B, 10C and 11;

FIG. 12B is a data structure for storing the output function lookup table of FIG. 12A;

FIG. 13 is a table pictorially representing the lookup table of FIG. 12A;

DETAILED DESCRIPTION

I. Overview

Figure 5A:
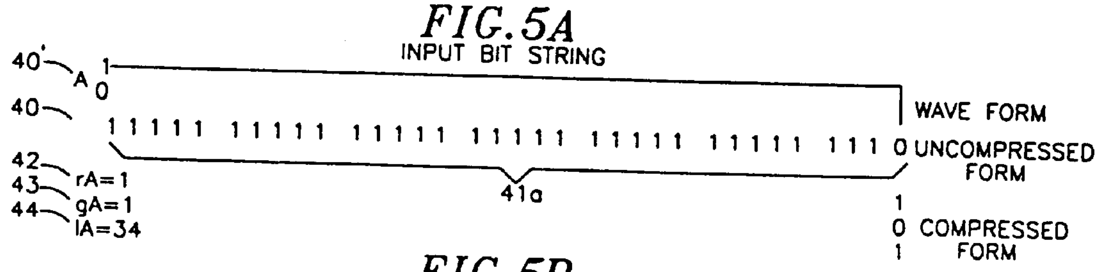
FIGS. 5A and 5B depict a pair of uncompressed bit strings.
Figure 5B:
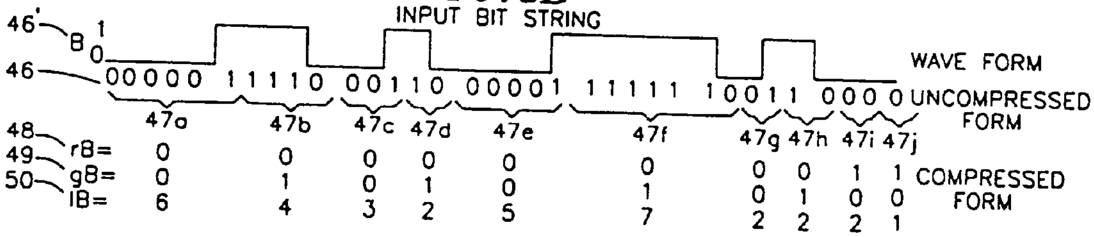
Figure 6A:
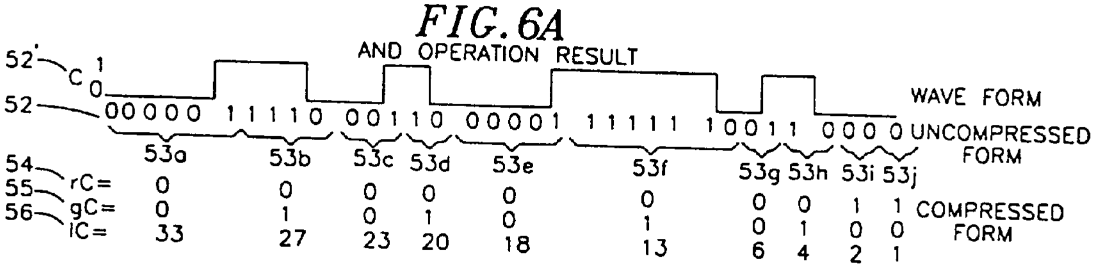
FIGS. 6A, 6B and 6C depict uncompressed resultant bit strings respectively formed by boolean AND, OR and XOR operations on the uncompressed bit strings of FIGS. 5A and 5B.
Figure 6B:
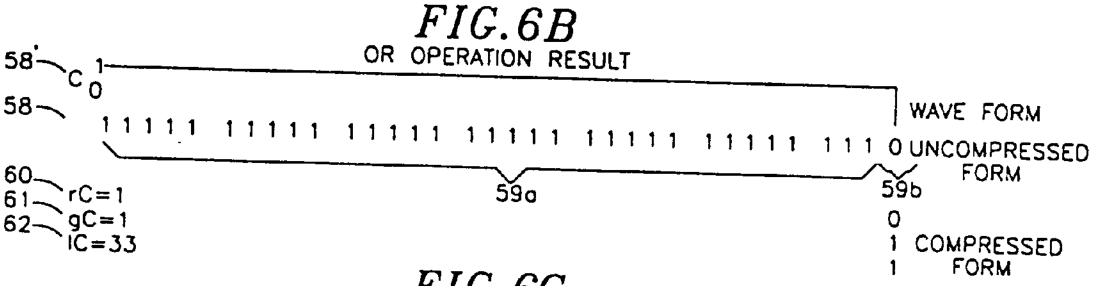
Figure 6C:
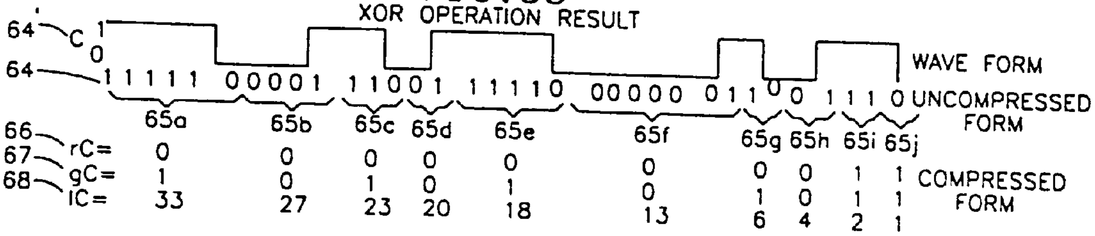

Referring to FIGS. 5A, 5B and 6A, an embodiment of the present invention performs a boolean operation on a pair of bit strings A 40 and B 46 to form a resultant bit string C 52. Both of the bit strings A and B are represented by a series of input bit slices 41*a*, 47*a–j* which, in the present example, are processed as runs (runs and impulses are further described hereinbelow).

The pair of bit strings A 40 and B 46 are processed, according to the boolean operation, by selecting from each of the pair of bit strings A 40 and B 46 the bit slice 41*a* having the longer length 44, and by processing this input bit slice 41*a* against one or more input bit slices 47*a–j* in the other bit string 46 for up to a number of bits equaling the longer length 41*a* and a series of at least one resultant bit slice 53*a–j* is formed as a result. In the described embodiment, whenever the resultant bit slice 53*a* creates an impulse for output, it is preferably further processed to provide an encoded, storage-efficient format.

II. Glossary

"Bit string": refers to a series of binary bits.

"Run": refers to a bit string of one or more contiguous bits of the same binary value (or gender).

"Impulse": refers to a bit string of one or more contiguous bits of the same binary value (or gender) followed by an ending bit having a binary value opposite the bits of the same binary value.

"Characteristic type": refers to an indicator that categorizes a bit string as either a run or an impulse.

"Gender": refers to an indicator that indicates the binary value of a run or an impulse and is also interchangeably referred to as "polarity."

"Uncompressed form": refers to a one-dimensional array of binary bits that is either a run or an impulse.

"Compressed form": refers to a representation of a run or an impulse that indicates: (1) polarity, (2) characteristic type and (3) length.

"Encoded form": refers to one or more contiguous impulses stored in a packed format.

III. Hardware, Software and Firmware Embodiments

A. Computer System Description

Figure 1:
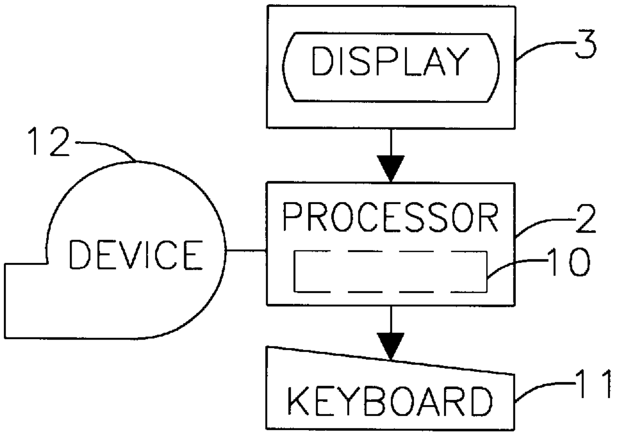
FIG. 1 is a functional block diagram of a computer system equipped with a computer platform for performing a boolean operation in accordance with the present invention.

A computer system is depicted in FIG. 1 having a programmable computer and computer programs for performing boolean operations on a pair of bit strings in accordance with the present invention. The computer system includes a programmable microprocessor 2, display 3, keyboard entry device 11 for the microprocessor 2 and an external storage device 12 for the storage or buffering of the bit strings. Conversion hardware, software or firmware and boolean operation hardware, software or firmware are housed in a computer platform 10 (shown in phantom lines) built into the microprocessor 2. The computer platform 10 coordinates the various activities related to performing boolean operations on bit strings, such as shown in U.S. Pat. No. 5,306,457 to Glaser et al.

Conventionally, the computer platform 10 is a general purpose programmable computer constructed on a printed circuit board which can easily be employed within most standard computer systems, including personal, mini and mainframe computers with computer program software for directing its operations as disclosed herein. It is also envisioned that the computer platform 10 can be a special purpose computer formed on an integrated circuit chip (or set of chips) or executable computer code burned into a read-only memory (ROM) chip that can be read in by conventional means or as microcode.

B. Computer Platform Description

Figure 2:
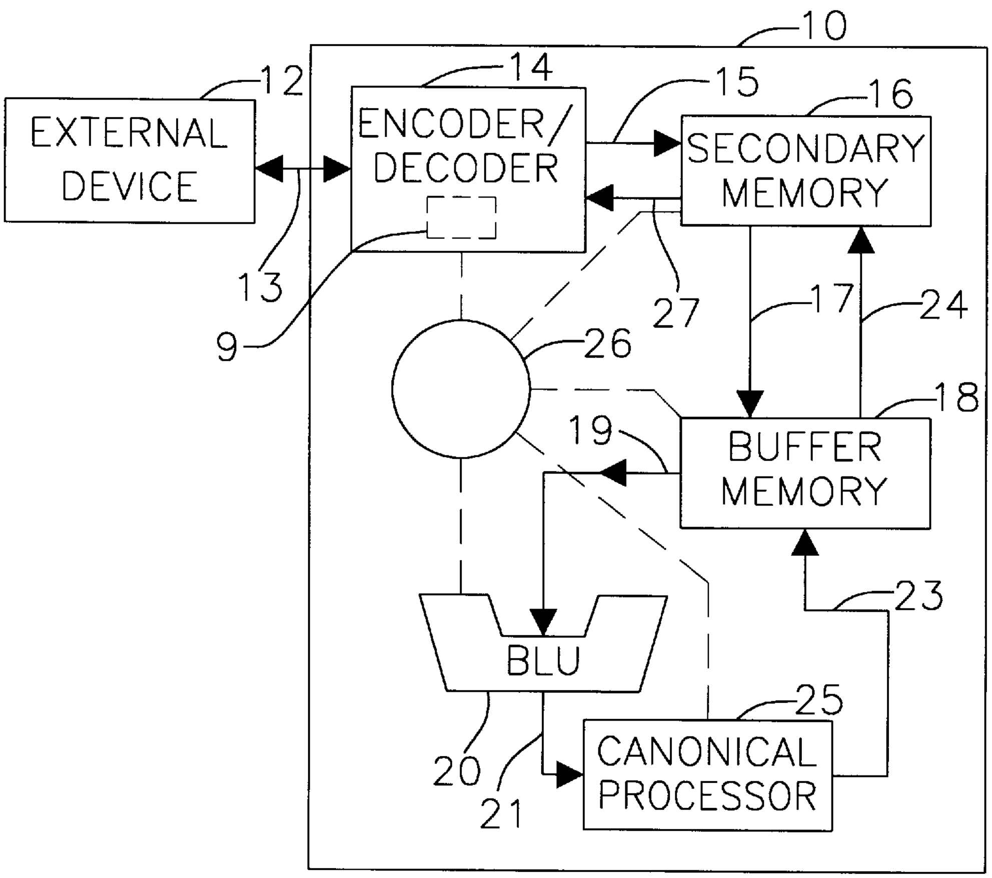
FIG. 2 is a functional block diagram of the computer platform of FIG. 1.

More particularly, referring to FIG. 2, the computer platform 10 includes an encoder/decoder 14, an optional secondary memory 16 (which can be located external to the computer platform 10) interconnected to an optional buffer memory 18 by buses 15 and 27, a boolean Logic Unit (BLU) 20, a canonical processing unit 25 and a system coordinator 26. When software programs (described further below) for encoding/decoding the bit strings, processing the boolean operations and coordinating data transfer between the components are loaded into the computer platform 10, the computer platform 10 is formed and ready for processing.

A detailed discussion of the specific components of the computer platform 10 is now presented. The external storage device 12 is a permanent or buffer storage unit, typically a hard disk, for storing encoded bit strings. The bit strings are representative of organized data in a relational database, unorganized data acquired by external communications means or any other type of data that can be represented by a contiguous sequence of bits.

The contents of the external device 12 are loaded by a bus 13 to the computer platform 10 and into the encoder/decoder 14 which separates encoded bit strings into one or more compressed impulses. An impulse is described throughout this document as having an ending bit, but the description applies equally to an impulse having a starting bit Also, the terms "polarity" and "gender" are used interchangeably and simply refer to binary value. The routines executed by the encoder/decoder 14 for encoding/decoding the bit strings into/from one of four different encoded impulse formats are described in U.S. Pat. No. 5,036,457 to Glaser et al.

The optional secondary memory 16 stores the compressed bit strings for future boolean operations and can be a memory component included in the host computer or a memory component included within the computer platform 10. The buffer memory 18 is another memory area for holding a compressed bit string temporarily before processing the bit string at the BLU 20 or before storing the bit string into the secondary memory 16 after processing.

The BLU 20 performs boolean operations on the two bit strings by utilizing a BLU embodiment implemented on a microprocessor (not shown), such as an Intel Pentium. Some or all of the boolean operations can be much more efficiently implemented in hardware. However, even if the boolean operations are implemented primarily in software, the BLU 20 can perform the boolean operations more efficiently in terms of storage, speed and so forth than presently known techniques for performing boolean operations on compressed bit strings. The BLU 20 can take full advantage of the latest components, such as 32-bit or 64-bit microprocessors with very fast clock speeds.

Once a resultant bit slice, that is, the result from performing a boolean operation on a pair of impulses or runs, has been determined by the BLU 20, the resultant bit slice is sent by a bus 21 to the canonical processing unit 25 which is essentially a pair of buffers for temporary holding resultant compressed (but not encoded) bit slices until they can be combined into a compressed impulse. When a compressed impulse is formed at the canonical processing unit 25, the impulse is output by a bus 23 to the buffer memory 18 for encoding.

The system coordinator 26 controls the processing of data on the computer platform 10. The operation of the bus system and the operation of the components on the computer platform 10 are controlled by software programs in the system coordinator 26. The dotted lines of FIG. 2 leading out from the system coordinator 26 show its control over the various components.

IV. Bit String Formats

Figure 3A:
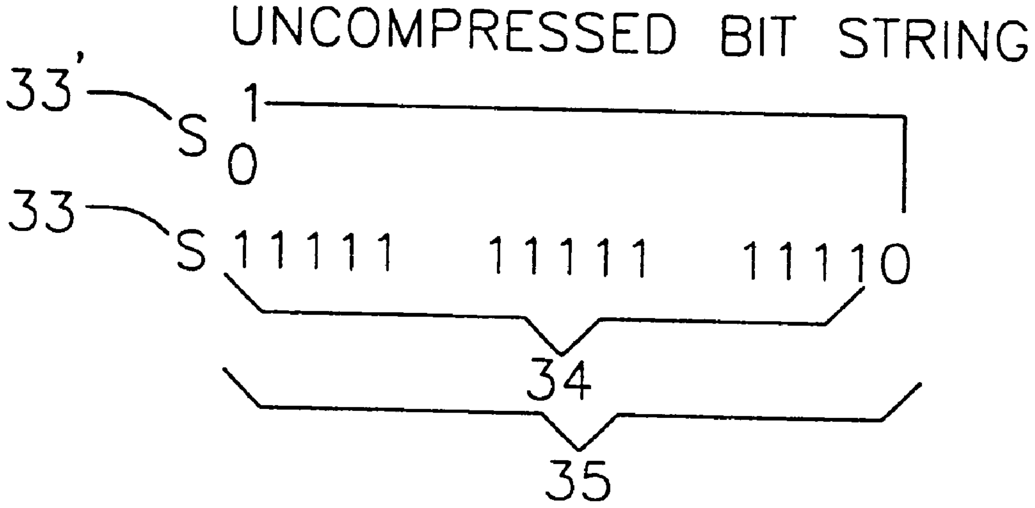
FIGS. 3A and 3B depict, by way of example, an uncompressed bit sting and a compressed bit string.
Figure 3B:
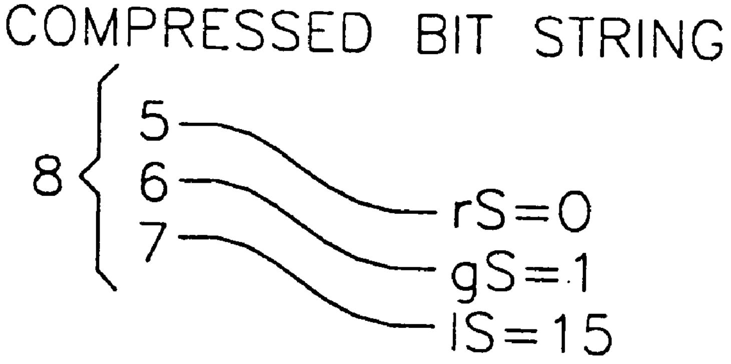

Referring to FIGS. 3A and 3B, a pair of uncompressed and compressed bit strings are shown pictorially as binary bit values 33, 36 and as binary valued wave forms 33', 36'. The binary bit values will be referred to throughout this document, but the same description applies interchangeably to binary valued wave forms.

A. Uncompressed Format

The two types of bit slices are a run 34 and an impulse 35. These are both raw bit strings as described above.

B. Compressed Format

Each bit slice, such as the run 34 or the impulse 35, can be represented by attributes 5, 6, 7 describing the slice in a compressed form. A boolean operation can be performed using attributes 5, 6, 7 without the need to uncompress the bit slice. In the described embodiment, the input attributes include: a characteristic type rS 5; a gender gS 6; and a length lS 7. The characteristic type rS 5 "0" or "1" indicates the slice is, respectively, an impulse 35 or a run 34. The gender gS 6 "0" or "1" identifies the gender of the one or more contiguous bits preceding the ending bit. The length lS 7 indicates the number of bits occurring in the slice. The example of FIG. 3 shows an impulse, that is, rS=0, contiguous bits having a gender of "1," that is, gS=1, with a length of 14 bits, that is, lS=14.

Although the described embodiment exclusively operates on compressed formats, the present invention can be extended to raw, uncompressed bit strings by compressing them as follows. For each uncompressed bit string 33, each slice 34, 35 in the string is formed by serially reading into a memory (not shown) one or more contiguous bits of the same gender, that is, a run 34, and counting the contiguous bits until a single bit of gender opposite that of the run 34, that is, an ending bit, is read. The attributes 5, 6, 7 are created as each impulse of a bit string is converted from uncompressed to compressed form. A "0" is stored in the characteristic type rS 5 to indicate a bit string that is an impulse 35 as well as the appropriate gender for the run 34 in the gender gS 6 and the bit count as the length lS 7. After the boolean operation has been completed, the resultant bit string can optionally be converted back into an uncompressed bit string 33.

A pair of input bit strings 40, 47 form slices A and B (not shown) and comprise characteristic types rA 42 and rB 48, genders gA 43 and gB 49 and lengths lA 44 and lB 50, respectively, wherein the lengths are the lengths of the impulses and the characteristic types rA and rB 5 are determined from the following equations:

$$rA=(lA<lB)|rA \quad (1)$$

$$rB=(lA>lB)|rB \quad (2)$$

where lA and lB are the lengths defined above. Equations (1) and (2) return either a "0" or "1" to indicate that the slices A and B are to be processed as an impulse 35 or a run 34, respectively, and store the returned values as the characteristic types rA 42 and rB 48. Equality, that is, equal lengths of 44, 50, is represented by the boolean condition ~rA & ~rB which indicates that both bit slices are impulses of the same length.

C. Relationships Between Bit String Formats

Figure 4:
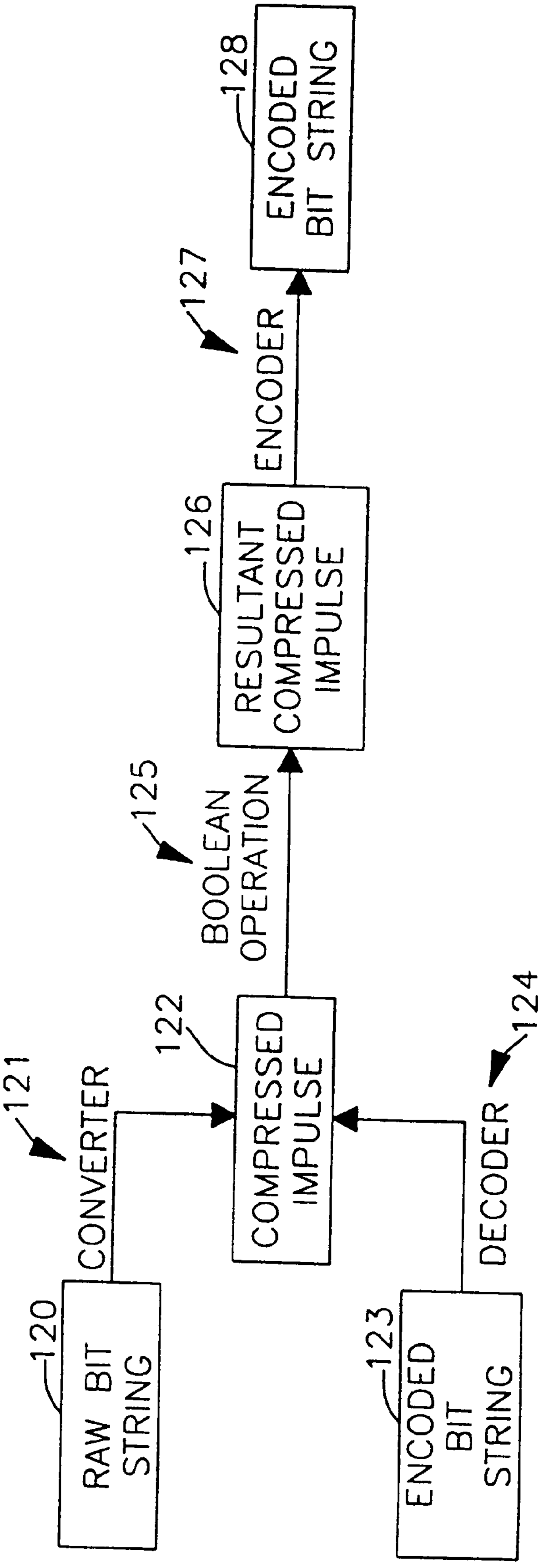
FIG. 4 is a flowchart depicting the relationships between raw bit strings, encoded bit strings and compressed impulses.

Referring to FIG. 4, a flow diagram illustrating the relationships between raw bit strings, encoded bit strings and compressed impulses is shown. Raw bit strings (block 120) are converted into compressed impulses (block 122) by bit string converter means 121, preferably the processor 2. Encoded bit strings (block 123) are decoded into compressed impulses (block 122) by decoder means 124, preferably the encoder/decoder 14.

Boolean operations 125 are performed in accordance with the present invention on pairs of compressed impulses (block 122) to form resultant compressed impulses (block 126). Optionally, the resultant compressed impulses (block 126) are encoded translated into bit strings (block 128) by encoder means 127, preferably the encoder/decoder 14.

V. Bit String Processing

Referring to FIGS. 5A, 5B, 6A, 6B and 6C, a pair of bit strings A 40 and B 46 are iteratively processed using the length of the longest ("maximal") current bit slice 41*a* during each cycle of a main program loop to form a resultant bit string 52, 58, 64. As above, the pair of bit strings A 40 and B 46 and each resultant bit string 52, 58, 64 are shown pictorially as binary bit values 40, 46, 52, 58, 64 and as binary valued wave forms 40', 46', 52', 58', 64'. The binary bit values will be referred to throughout this document, but the same description applies interchangeably to binary valued wave forms.

The resultant attributes 54, 55, 56 for each resultant bit slice 53*a–j* in the resultant bit string C 52 is determined by five output functions, described in further detail below. The output from each function is based on input parameters obtained from the input attributes 42, 43, 44, 48, 49, 50 associated with each input bit slice 41*a*, 47*a–j*.

The number of bits processed during each cycle of the main program loop is the number of bits in the longer of the two slices as expressed by the following equation:

$$lC=\mathrm{MAX}(lA,lB)-\mathrm{take} \quad (3)$$

where lA and lB are the lengths of the input bit slices, such as lengths 41*a*, 47*a*, for each of the input bit strings A 40 and B 46, lC is the length of the resultant bit slice 47*a*, 53*a*, 65*a* for the resultant bit string 52, 58, 64, MAX( ) is a function returning the maximum bit slice length, and take equals a one value ("1") if the lengths of the input slices 41*a*, 47*a* are not equal, else take equals a zero value ("0"). As the number of bits processed during each cycle can be very large, significant speed up over the minimal length impulse technique can be achieved.

A. Input Parameters

Three items of information must be known or ascertained to determine the input parameters: the desired boolean operation illustrated in FIGS. 7A, 7B, 7C, 8A, 8B, 8C, 9A, 9B and 9C; the input attributes 42, 43, 44 for each input bit slice 41*a* in the bit string A 40; and the input attributes 48, 49, 50 for each input bit slice 47*a* in the bit string B 46.

Three elementary boolean operations are implemented: an AND illustrated in FIGS. 7A, 8A, 9A and 10A; an OR illustrated in FIGS. 7B, 8B, 9B and 10B; and an XOR (exclusive OR) illustrated in FIGS. 7C, 8C, 9C, 10C and 11.

Although not described particularly, further boolean operators or derivations can be performed such as shown in Table 1. Furthermore, boolean operations on more than two inputs are envisioned. In addition, by way of example, further boolean operators include NAND (complemented AND), NOR (complemented OR), XNOR (complemented XOR), XAND (exclusive AND), and XNAND (complemented exclusive AND). Derivations include equivalent or combinational boolean operators formed by applying conventional boolean algebraic properties and theorems, such as the additive, commutative and distributive properties or DeMorgan's Theorem. The foregoing list is not exhaustive and still further boolean operations are possible within the scope of the present invention.

B. Output Functions

In the following descriptions, each action or output function is presented in a Karnaugh map, one map for each type of boolean operation AND, OR and XOR. Each Karnaugh map is a table consisting of rows and columns. Referring by way of example to FIG. 7A, each row is indexed by the characteristic type rA 70 and the gender gA 71 from the input attributes 42, 43 for each bit slice 41*a* in the bit string A 40. Each column is indexed by the characteristic type rB 73 and the gender gB 74 from the input attributes 48, 49 for each bit slice 47*a–j* in the bit string B 46. A characteristic type and gender pair rA, gA 72 from the bit string A 40 and a characteristic type and gender pair rB, gB 75 for the bit string B 46 are specified to identify one of the rows 72 and one of the columns 75 in the Karnaugh map. The output of each function is indicated by a binary bit at the intersection of the row 72 and the column 75.

1. Action Function

Karnaugh maps indicating the type of action to be performed for boolean AND, OR and XOR operations are respectively shown in FIGS. 7A, 7B and 7C. The action can be either a copy action or a scan action. During each cycle, the input bit slice with the maximum, that is, longer length, is selected between pairs of input bit slices, such as bit slices 41*a*, 47*a*, for each of the pair of input bit strings A 40 and B 46.

A copy action is performed if the individual genders and lengths of the one or more input bit slices from the shorter bit slice need to be taken into consideration. Otherwise, a scan action is performed. However, if the lengths of the input bit slices are equal, either a scan or a copy action can be performed. In such cases, a scan action is preferred because it operates faster than a copy action.

Accordingly, the situations in which a copy or a scan action is required are tabulated in the Karnaugh maps 80, 81, 82 as a one value ("1") and a zero value ("0"), respectively. A one value ("1") indicates that the input bit string will be copied, slice-by-slice, up to a number of bits equaling the longer bit length. The input bit slice with the longer bit length is ignored since the resultant bit slices are based on the attributes for each of the one or more shorter input bit slices. A zero value ("0") indicates that the shorter input bit string must be scanned up to a number of bits equaling length lC. The gender of one or more shorter input bit slices is ignored for the output since the resultant bit slice is based on the attributes of the length lC.

2. Characteristic Type Function

Karnaugh maps indicating the characteristic type rC 54, 60, 66 of the resultant bit slice 53*a–j*, 59*a–j*, 65*a–j* for boolean AND, OR and XOR operations respectively are shown in FIGS. 8A, 8B and 8C. A characteristic type can either be a run or an impulse. Accordingly, the situations in which a run or an impulse is output in the resultant bit slice are tabulated in the Karnaugh maps 85, 86, 87 as a one value ("1") for a run and a zero value ("0") for an impulse.

3. Gender Function

Karnaugh maps indicating the gender gC 55, 61, 67 of the resultant bit slice 53*a–j*, 59*a–j*, 65*a–j* for boolean AND, OR and XOR operations are respectively shown in FIGS. 9A, 9B and 9C. Accordingly, the appropriate genders are tabulated in the Karnaugh maps 90, 91, 92 as a one value ("1") and zero value ("0"), respectively.

4. Take Function

Karnaugh maps indicating whether a "take" bit is required for boolean AND, OR and XOR operations are respectively shown in FIGS. 10A, 10B and 10C. A take bit is a single bit value that is subtracted from the longer bit length 44 in accordance with equation (3), described above. The take bit is a function of the lengths lA 44 and lB 50 of the input bit slices 41*a*, 47*a* from each of the pair of bit strings A 40 and B 46. If the lengths are not equal, a take bit is set to "1", otherwise it is set to "0". Accordingly, the situations in which a take bit is (or is not) required are tabulated in the Karnaugh maps 95, 96, 97 as a one value ("1") and a zero value ("0"), respectively.

5. Flip Function

A Karnaugh map indicating whether a "flip" action must be performed for a boolean XOR operation is shown in FIG. 11. A flip action, as represented by a flip bit, means that the gender of the resultant bit slice 65*a–i* must be complemented by "flipping" the gender of each bit being output or determined from the current bit slice 47*a–j*. Accordingly, the situations in which a flip action is (or is not) performed are tabulated (as flip bits) in the Karnaugh map 102 as a one value ("1") and a zero value ("0"), respectively. There are no Karnaugh maps for the boolean AND and OR operations since the resultant bit slices 53*a–i*, 59*a–i* for those boolean operations are never complemented and therefore the Karnaugh maps would be all zero values.

C. Output Function Lookup Table

The Karnaugh maps for the five output functions of FIGS. 7A, 7B, 7C, 8A, 8B, 8C, 9A, 9B, 9C, 10A, 10B, 10C and 11 are combined into the output function lookup table shown in FIG. 12A. There are four sets of columns respectively corresponding to the characteristic types and genders of the input bit slices and the outputs from the functions corresponding to each of the boolean AND, OR and XOR operations. In particular, the first column is indexed by the characteristic type rA 70 and the gender gA 71 from the input attributes 42, 43 for each bit slice 41*a* in the bit string A 40 and the characteristic type rB 73 and the gender gB 74 for the input attributes 48, 49 for each bit slice 47*a–j* in the bit string B 46. The columns for the boolean AND, OR and XOR operations contain the outputs for the functions corresponding to the action a 80, 81, 82, the characteristic type rC 85, 86, 87, the gender gC 90, 91, 92, the take bit t 95, 96, 97 and flip bit f 100, 101, 102. A characteristic type rA and gender gA pair from the bit string A 40 and a characteristic type rB and gender gB pair for the bit string B 46 are specified to select a row 106 in the lookup table. The output of each function 105 is at the intersection of the row 106 and the column corresponding to the output function for the selected boolean operation.

VI. Examples

Referring to FIG. 13, for ease of understanding, a table pictorially representing the Output Function Lookup Table of FIG. 12A is shown. It is indexed in the same manner as the lookup table using a characteristic type rA and gender gA pair from the bit string A 40 and a characteristic type rB and gender gB pair for the bit string B 46. The action, characteristic type rC and gender gC of the resultant bit slice, take bit and flip bit are described textually 115 in columns 110, 111 and 112 organized by the boolean operations AND, OR and XOR, respectively. In addition, the respective input attributes 42, 43, 44, 48, 49, 50 for each of the input bit slices 41*a*, 47*a*, and in particular, the characteristic types rA 42 and rB 48, genders gA 43 and gB 49 and lengths lA 44 and lB 50 are illustrated graphically in column 113. As with the lookup table of FIG. 12A, the outputs 115 of each of the output functions is described at the intersection of the row 114 matching the input attributes and the column 110, 111, 112 matching the selected boolean operation.

An example of each boolean operation will now be described with reference to FIG. 13 which pictorially shows the binary valued wave forms for the pair of bit slices and is therefore easy to understand in light of the examples.

A. Boolean AND Operation

Assume that the desired boolean operation is an AND 110. The pair of input bit strings A 40 and B 46 are shown in FIGS. 5A and 5B. The resultant bit string C 52 is shown in FIG. 6A. A first bit slice 41*a* is selected from the bit string A 40 and a second bit slice 47*a* is selected from the bit string B 46. The first bit slice 41*a* has input attributes comprising a characteristic type rA 42 equaling "1" (indicating that the first bit slice 41*a* is a run up to the length of the shorter bit slice) which was calculated from equation (1), a gender gA 43 of "1" (indicating that the first bit slice 41*a* contains a run having a polarity of "1") and a length lA 44 of 34 bits. The second bit slice up to the length of the shorter bit slice 47*a* has input attributes comprising a characteristic type rB 48 of "0" (indicating that the second bit slice 47*a* is an impulse up to the length of the shorter bit slice), a gender gB 49 of "0" (indicating that the second bit slice 47*a* contains a run having a polarity of "0") and a length lB 50 of 6 bits.

The row 114 equating to "1100" (formed by combining rA, gA, rB and gB into the bit string "1100") in FIG. 13 is selected to determine the outputs from the output functions for an AND operation (column 110). Since the first bit slice 41*a* has a longer bit length lA 44 than the second bit slice 47*a*, each of the shorter bit slices 47*a–j* in the bit string B 46 will be copied up to a number of bits equaling the length lA 44 of the first bit slice 41*a* minus a take bit, that is, for 33 bits, to the resultant bit slice C 52. Upon completion of the copy, a single bit will remain in the first bit slice 41*a* while the second bit slice will have become bit slice 47*j* of which one bit (with implied trailing zero bits) remains.

Next, the row 116 equating to "1010" in FIG. 13 is selected (column 110). Since the remaining portion of bit slice 41*a* has a longer bit length lA 44 (including implied trailing zeroes) than the shorter bit slice 47*j*, the shorter bit slice 47*j* in the bit string B 46 will be scanned after which an end-of-input condition will be detected and the operation completed.

B. Boolean OR Operation

Assume that the desired boolean operation is an OR 111. The pair of input bit strings A 40 and B 46 are shown in FIGS. 5A and 5B. The resultant bit string C 52 is shown in FIG. 6A. A first bit slice 41 a is selected from the bit string A 40 and a second bit slice 47*a* is selected from the bit string B 46. The first bit slice 41*a* has input attributes comprising a characteristic type rA 42 equaling "1" (indicating that the first bit slice 41*a* is a run up to the length of the shorter bit slice) which was calculated from equation (1), a gender gA 43 of "1" (indicating that the first bit slice 41*a* contains a run having a polarity of "1") and a length lA 44 of 34 bits. The second bit slice up to the length of the shorter bit slice 47*a* has input attributes comprising a characteristic type rB 48 of "0" (indicating that the second bit slice 47*a* is an impulse up to the length of the shorter bit slice), a gender gB 49 of "0" (indicating that the second bit slice 47*a* contains a run having a polarity of "0") and a length lB 50 of 6 bits.

The row 114 equating to "1100" in FIG. 13 is selected to determine the outputs from the output functions for an OR operation (column 111). Since the first bit slice 41 a has a longer bit length lA 44 than the second bit slice 47*a*, each of the shorter bit slices 47*a–j* in the bit string B 46 will be scanned up to a number of bits equaling the length lA 44 of the first bit slice 41*a* minus a take bit, that is, for 33 bits, to the resultant bit slice C 58. Upon completion of the scan, a single bit will remain in the first bit slice 41*a* while the second bit slice will have become bit slice 47*j* of which one bit remains.

Next, the row 116 equating to "1010" in FIG. 13 is selected (column 110). Since the remaining portion of bit slice 41 a has a longer bit length lA 44 (including implied trailing zeroes) than the shorter bit slice 47*j*, the shorter bit slice 47*j* in the bit string B 46 will be copied after which an end-of-input condition will be detected and the operation completed.

C. Boolean XOR Operation

Assume that the desired boolean operation is an XOR 112. The pair of input bit strings A 40 and B 46 are shown in FIGS. 5A and 5B. The resultant bit string C 52 is shown in FIG. 6A. A first bit slice 41*a* is selected from the bit string A 40 and a second bit slice 47*a* is selected from the bit string B 46. The first bit slice 41*a* has input attributes comprising a characteristic type rA 42 equaling "1" (indicating that the first bit slice 41*a* is a run up to the length of the shorter bit slice) which was calculated from equation (1), a gender gA 43 of "1" (indicating that the first bit slice 41*a* contains a run having a polarity of "1" ) and a length lA 44 of 34 bits. The second bit slice up to the length of the shorter bit slice 47*a* has input attributes comprising a characteristic type rB 48 of "0" (indicating that the second bit slice 47*a* is an impulse up to the length of the shorter bit slice), a gender gB 49 of "0" (indicating that the second bit slice 47*a* contains a run having a polarity of "0") and a length lB 50 of 6 bits.

The row 114 equating to "1100" in FIG. 13 is selected to determine the outputs from the output functions for an XOR operation (column 112). Since the first bit slice 41*a* has a longer bit length lA 44 than the second bit slice 47*a*, each of the shorter bit slices 47*a–j* in the bit string B 46 will be copied up to a number of bits equaling the length lA 44 of the first bit slice 41*a* minus a take bit, that is, for 33 bits, to the resultant bit slice C 64 since the flip bit is indicated. Upon completion of the copy, a single bit will remain in the first bit slice 41*a* while the second bit slice will have become bit slice 47*j* of which one bit remains.

Next, the row 116 equating to "1010" in FIG. 13 is selected (column 110). Since the remaining portion of bit slice 41*a* has a longer bit length lA 44 (including implied trailing zeroes) than the shorter bit slice 47*j*, the shorter bit slice 47*j* in the bit string B 46 will be copied after which an end-of-input condition will be detected and the operation completed.

VII. Computer Program Structure

Figure 14:
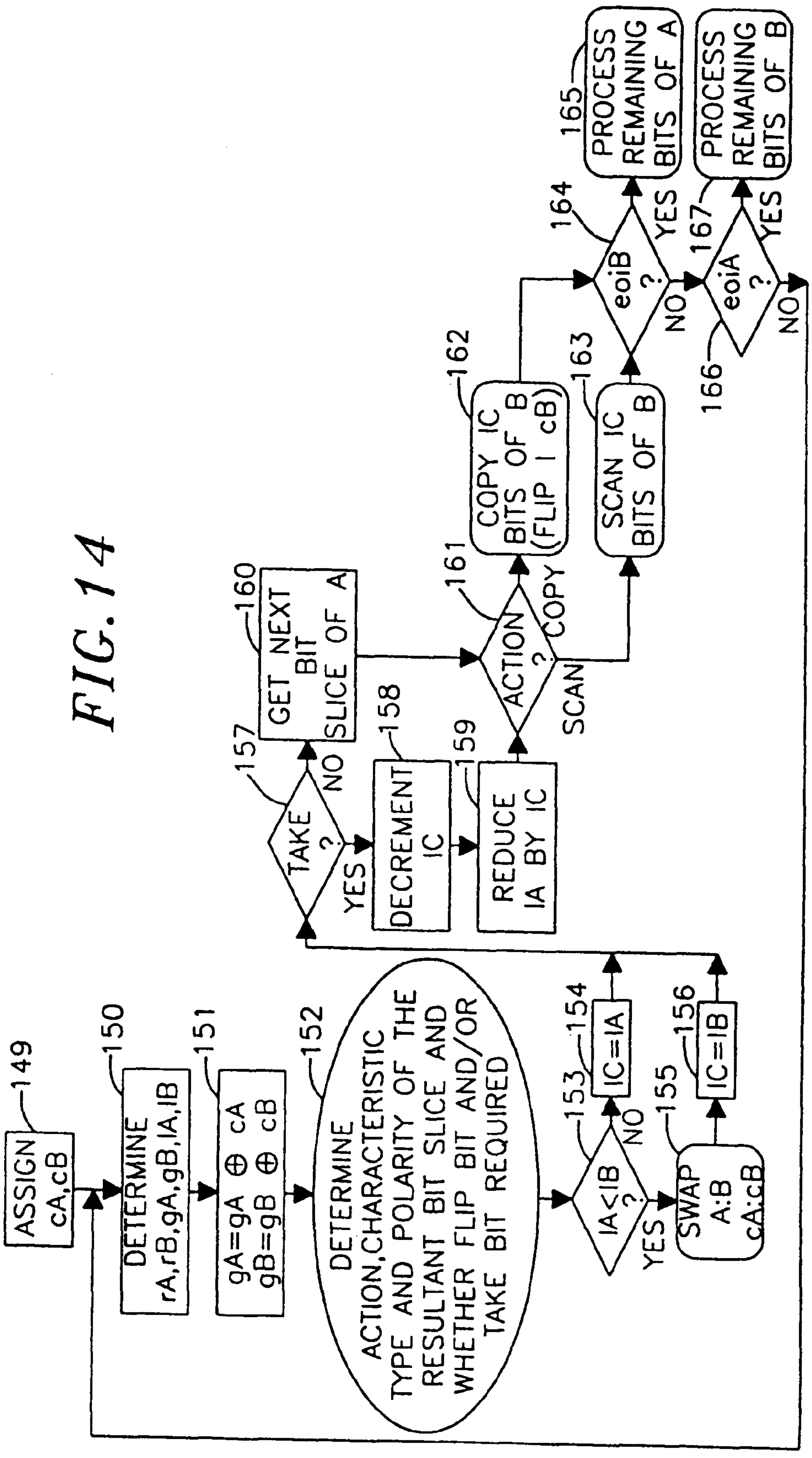
FIG. 14 is a flow diagram of a method for performing a boolean operation in accordance with the present invention.
Figure 15:
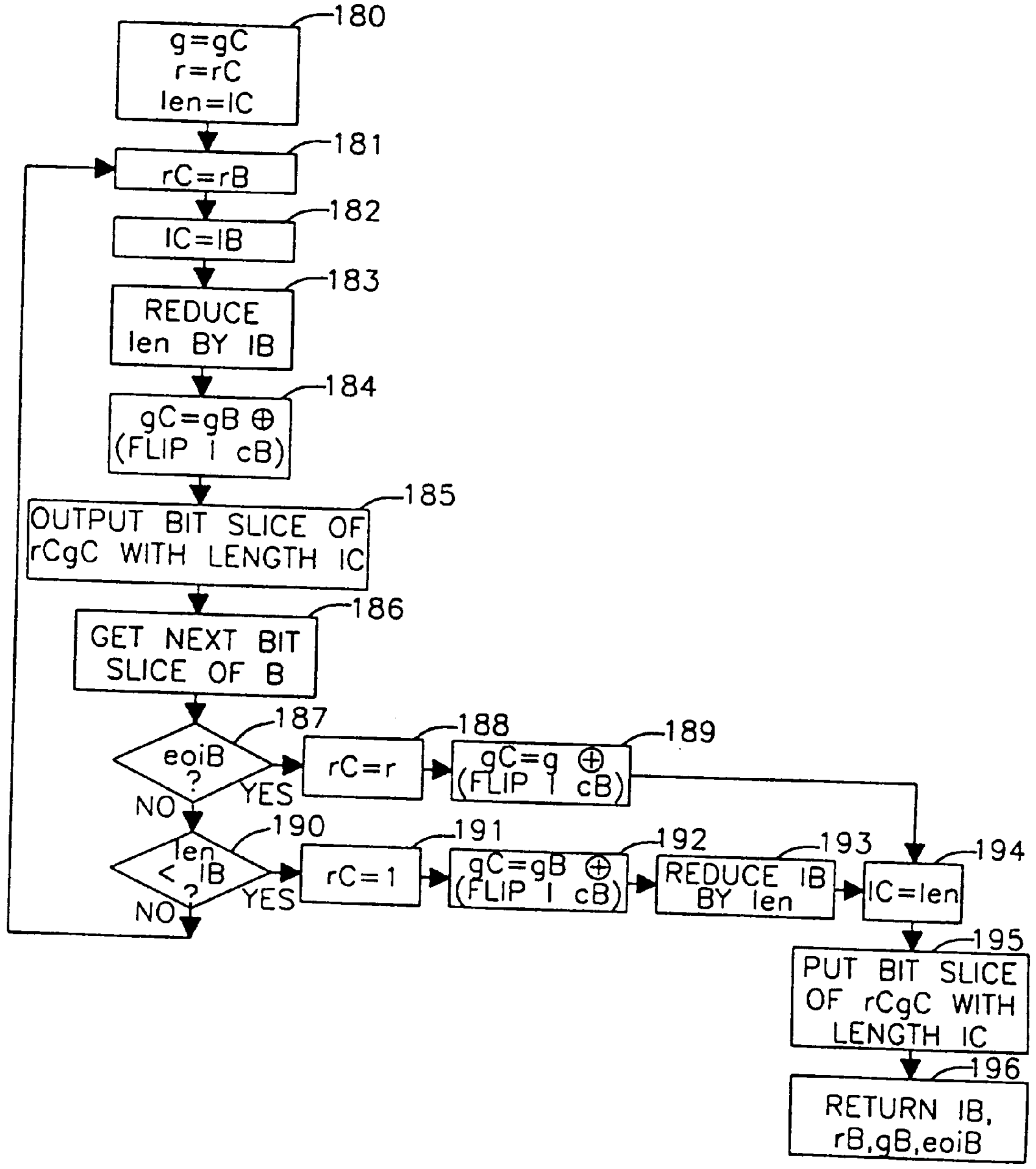
FIG. 15 is a flow diagram of a copy function used by the method of FIG. 14.
Figure 16:
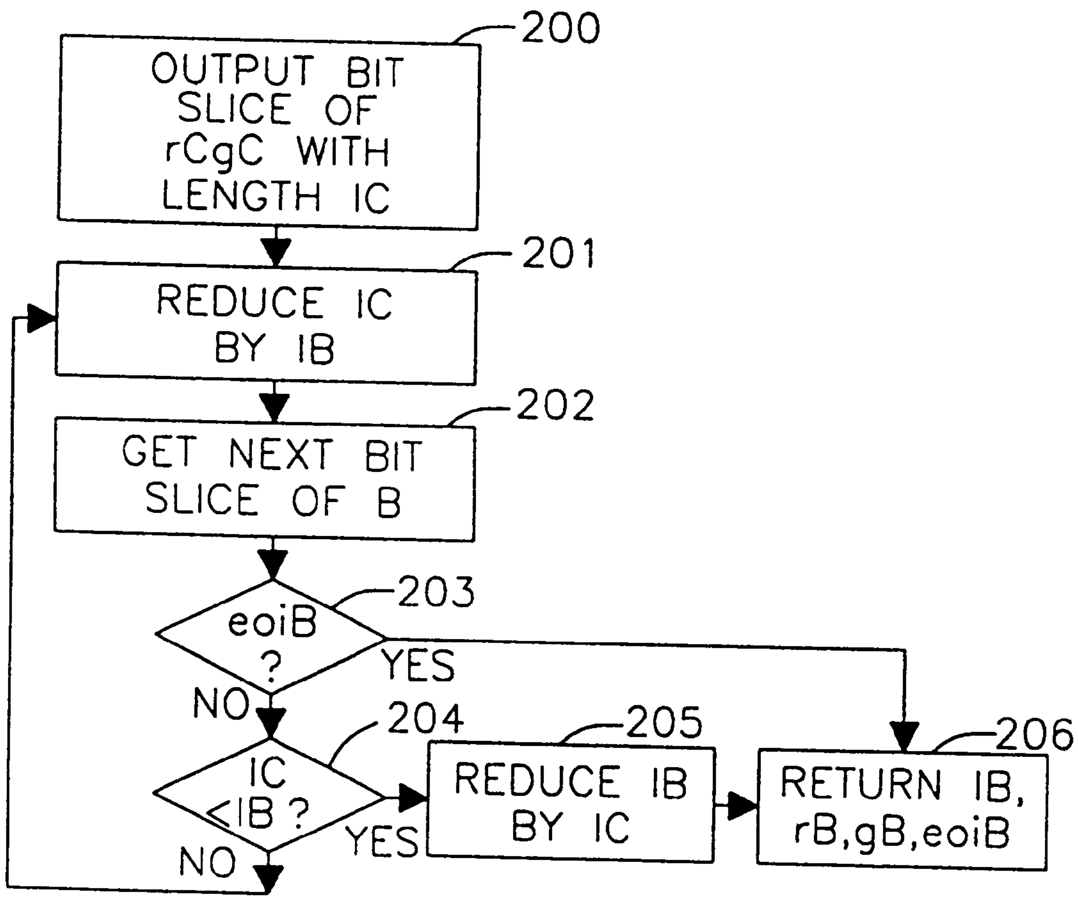
FIG. 16 is a flow diagram of a scan function used by the method of FIG. 14.

The structure of a computer program for use in the system of FIG. 1 and a process created by the computer program for performing a boolean operation in accordance with the present invention is shown diagrammatically in the flow diagrams of FIGS. 14–16.

A. Maximal Loop

The process for performing boolean operations 110, 111, 112 on a pair of bit strings A and B to form a resultant bit string C is shown in FIG. 14. Its purpose is to iteratively process, according to the boolean operation, bit slices from the pair of bit strings A and B for up to a number of bits equaling a maximal bit slice with length lC during each cycle.

The bit strings A 40 and B 46, including their respective input attributes 42, 43, 44, 48, 49, 50, are stored in the secondary memory 16 and staged in the buffer memory 18 prior to being loaded into the BLU 20 for processing. A pair of complement indicator flags cA and cB representing a complement of the bit strings A 40 and B 46, respectively, are set (block 149). The main program loop (blocks 150–166) is now entered. Bit slices 41*a*, 47*a* are selected, one from each of the bit strings A 40 and B 46, and their input attributes, comprising their respective lengths lA 44 and lB 50, genders gA 43 and gB 49, and characteristic types rA 42 and rB 48 are determined (block 150). The genders gA 43 and gB 49 are dependent on their respective complement indicator flags cA and cB and are used to invert if the latter flags are set (block 151). Based on these input attributes, the type of action to be performed (scan or copy) 80, 81, 82, the characteristic type rC 85, 86, 87 and gender gC 90, 91, 92 of the resultant bit slice 53*a–j*, 59*a–b*, 65*a–j* and whether a take bit 95, 96, 97 or flip bit 100, 101, 102 are required are determined (block 152).

Referring to FIG. 12B, a data structure is shown describing a two dimensional array functions[3][16] (3 columns and 16 rows) for storing the actions a, characteristic types rC, genders gC, take bits t and flip bits f shown in the lookup table of FIG. 12A. The three columns are for indicating the desired boolean operation (AND, OR or XOR) and the 16 rows are for storing the actions a, characteristic types rC, genders gC, take bits t and flip bits f corresponding to the desired boolean operation. The array functions[3][16] is indexed by the desired boolean operation to select a column and by the characteristic type rA and gender gA of bit string A 40 and the characteristic type rB and gender gB of bit string B 46 to select a row. The array functions[3][16] is stored in the external storage device 12 and is read into the secondary memory 16 when the computer program software is loaded at program startup.

Once the action, characteristic type and gender have been determined and stored, the input bit slice with a longer bit length is selected from between the input bit slices 41*a*, 47*a* for the pair of bit strings A 40 and B 46 by comparing their respective bit lengths lA 44 and lB 50 (block 153). If input bit slice 41*a* from the bit string A 40 has the longer bit length lA 44, the bit length lC 56, 62, 68 of the resultant bit slice 53*a*, 59*a*, 65*a* is set to equal the bit slice length lA 44 (block 154). If the bit slice 47*a* from the bit string B 46 has the longer bit length lB 50, the bit strings A 40 and B 46 and their complement indicator flags cA and cB are swapped (block 155) because, by convention, the bit string with the bit slice having the longer bit length is always considered to be the bit string A. Next, the bit length lC 56, 62, 68 of the resultant bit slice 53*a*, 59*a*, 65*a* is set to equal the bit length lB 50 (block 156).

Based on the input attributes 42, 43, 48, 49 for the pair of input bit slices 41*a*, 47*a*, the take bit 95, 96, 97 is determined and if the take bit is non-zero (block 157), the length lC 56, 62, 68 of the resultant bit slice 53*a*, 59*a*, 65*a* is decremented (block 158) and the length lA 44 of the longer bit slice 41*a* is reduced by the length lC 56, 62, 68 of the resultant bit slice 47*a*, 53*a*, 65*a* (block 159). Otherwise, if the take bit is zero (block 157), the next input bit slice following bit slice 41*a*, if any (in the bit string 40 shown in FIG. 5A, there is no next input bit slice) of bit string A 40, that is, the bit string having the longer bit slice, is obtained from secondary memory 16 (block 160).

If a copy action (as determined in block 152) is required (block 161), a number of bits equaling 33 (the length lC 56, 62, 68 of the resultant bit slice 53*a–i*, 65*a–i*) are copied from the bit string B 46 (block 162), as further described below in connection with FIG. 15. If a scan action (as determined in block 152) is required (block 161), a number of bits equaling 33 (the length lC 56, 62, 68 of the resultant bit slice 59*a*) are scanned from the bit string B 46 (block 163), as further described below in connection with FIG. 16.

If the end of the bit string B 46 is detected (block 164) as indicated by the end-of-input variable eoiB, the remaining bits in the bit string A 40 are processed (block 165) by outputting the remaining bits of bit string A 40 into the canonical processor 25, whereupon the program terminates. Otherwise, if the end of the bit string B 46 is not detected (block 164) and if the end of the bit string A 40 is detected (block 166) as indicated by the end-of-input variable eoiA, the remaining bits of the bit string B 46 are processed (block 167) by copying the remaining bits of bit string B 46 into the canonical processor 25, whereupon the program terminates. Otherwise, if the end of the bit string A 40 is not detected (block 166), control resumes at the top of the main program loop (blocks 151–166) for the next set of input bit slices 41*a*, 47*j*, if any.

B. Copy Procedure

A procedure for performing a copy action (block 162) based on the above process is shown in FIG. 15. Its purpose is to copy, slice-by-slice, a number of bits from the bit string B 46 equaling the length lC 56, 62, 68 of the resultant bit slice 53*a*, 59*a*, 65*a* for the resultant bit string C 52, 58, 64. Initially, the gender gC 55, 61, 67, characteristic type rC 54, 60, 66 and length lC 56, 62, 68 of the resultant bit slice 53*a*, 59*a*, 65*a* are stored into the program variables g, r and len, respectively (block 180).

The loop (blocks 181–190) for processing each of the one or more input bit slices 47*a–j* in the bit string B 46 begins. First, the characteristic type rB 48 and length lB 50 for the current input bit slice 47*a* are copied to the characteristic type rC 54, 66 and length lC 56, 68 of the current resultant bit slice 53*a*, 65*a* (blocks 181 and 182, respectively). The value in the program variable len is reduced by the length lB 50 of the current bit slice 47*a–i* (block 183). The gender gC 55, 67 of the resultant bit slice 53*a*, 65*a* is set to the same gender gB 49 as the current input bit slice 47*a–i*, but if either the flip bit 100, 101, 102 or the complement indicator flag cB are on, the gender gC 55,67 of the resultant bit slice 53*a*, 65*a* is complemented (block 184). The current resultant bit slice 53*a*, 65*a* is output to the canonical processor 25, comprising a characteristic type rC 54,66, gender gC 55, 67 and length IC 56, 68 (block 185) and the next input bit slice 47*b* ofthe bit string B 46 is obtained (block 186). If the end of the bit string B 46 is detected (block 187) as indicated by the end-of-input variable eoiB, the processing loop (blocks 181–190) is exited to block 188. To complete processing, the characteristic type rC 54, 66 and gender gC 55, 67 of the resultant bit slice 53*a*, 65*a* are set to the characteristic type and gender stored (in block 180) in the program variables r and g (blocks 188 and 189, respectively). As above, if either the flip bit 100, 101, 102 or the complement indicator flag cB are set, the gender gC 55, 67 of the resultant bit slice 53*a*, 65*a* is complemented (block 189). If the end of the bit string B 46 is not detected (block 187), the length in the program variable len is compared to the length lB 48 of the current input bit slice 47*b–i*. If the stored length len is less than the current input bit slice length lB 50, the processing loop (blocks 181–190) is exited. Otherwise, processing continues at the beginning of the processing loop (blocks 181–190).

If the processing loop (blocks 181–190) is exited (block 190), the characteristic type rC 54, 66 and gender gC 55, 67 of the resultant bit slice 53*a*, 65*a* are set to the value one ("1") and the gender gB 49 of the current input bit slice 47*b–i* (blocks 191 and 192, respectively). As above, if either the flip bit 100, 101, 102 or the complement indicator flag cB are set, the gender gC 55, 67 of the resultant bit slice 53*a*, 65*a* is complemented (block 192). Also, the length lB 50 of the current input bit slice 47*b*–i is reduced by the value in the program variable len (block 193). Finally, the length lC 56, 68 of the resultant bit slice 53*a*, 65*a* is set to the length in the program variable len (block 194) and the current resultant bit slice 53*a*, 65*a* is output to the canonical processor 25, comprising a characteristic type rC 54, 66, gender gC 55, 67 and length lC 56, 68 (block 195). The length lB 50, characteristic type rB 48, gender gB 49 and end-of-input variable eoiB for the bit string B 46 are returned (block 196).

C. Scan Procedure

A procedure for performing a scan (block 163) based on the above process is shown in FIG. 16. Its purpose is to scan one or more of the input bit slices 47*a–j* in the bit string B 46 for up to a number of bits equaling the length lC. The current resultant bit slice 59*a* is output to the canonical processor 25 comprising a characteristic type rC 60, a gender gC 61 and a length lC 62 (block 200). The loop (blocks 201–204) for processing the one or more shorter input bit slices 47*a–i* in the bit string B 46 begins. First, the length lC 62 of the resultant bit slice 59*a* is reduced by a number of bits equaling the length lB 50 of the bit string B 46 lock 201). The next input bit slice 47*b* of the input bit string B 46 is obtained (block 202). If the end of the bit string B is detected (block 203) as indicated by the end-of-input variable eoiB, the processing loop (blocks 201–204) is exited. Otherwise, if the length lC 62 of the resultant bit slice 59*a* is less than the length lB 50 of the current input bit slice 47*b* (block 204), processing continues at the beginning of the processing loop (blocks 201–204). Otherwise, the processing loop (blocks 201–204) is exited and the length lB 50 of the current input bit slice 47*b–i* is reduced by the number of bits equaling the length lC 62 of the resultant bit slice 59*a* (block 205). The length lB 50, characteristic type rB 48, gender gB 49 and end-of-input variable eoiB B 46 are returned (block 206).

While the invention has been particularly shown and described with reference to preferred embodiments, those skilled in the art will appreciate that the foregoing and other changes in form or detail can be made without departing from the scope and the spirit of the present invention.

TABLE 1

| | Boolean Operator | Boolean Equation |
|---|---|---|
| 1 | FALSE | (0) |
| 2 | AND | (A ∧B) |
| 3 | AND NOT | (A∧¬B) |

TABLE 1-continued

| | Boolean Operator | Boolean Equation |
|---|---|---|
| 4 | PASS A | (A) |
| 5 | NOT AND | (¬A∧B) |
| 6 | PASS B | (B) |
| 7 | XOR | (A⊕B) |
| 8 | OR | (A∨B) |
| 9 | NOR | (¬A∧¬B) |
| 10 | XNOR | ¬(A⊕B) |
| 11 | NOT B | ¬B |
| 12 | OR NOT | (A∨¬B) |
| 13 | NOT A | ¬A |
| 14 | NOT OR | (¬A∨B) |
| 15 | NAND | ¬(A∧B) |
| 16 | TRUE | (1) |

We claim:

1. A method comprising the step of:

using a computer to operate a relational database management system for performing a boolean operation on bit strings to form a resultant bit string, the bit strings representing organized data in the relational database management system, the resultant bit string representing records in the relational database management system satisfying conditions of a query by a user, each such bit string divided into input bit slices, the resultant bit string divided into resultant bit slices, the step of using a computer further comprising the steps of:

determining an action according to the boolean operation based on a first input bit slice from a first bit string representing organized data in the relational database management system and on a second input bit slice from a second bit string representing organized data in the relational database management system;

selecting, from between the first input bit slice and the second input bit slice, the input bit slice with a longer bit length; and processing, according to the determined action, the longer input bit slice and a plurality of the input bit slices in the bit string having the input bit slice with a shorter bit length, for up to a number of bits in the bit string having the longer bit length to form at least one resultant bit slice for the resultant bit string satisfying the conditions of the user query.

2. A method according to claim 1, wherein each input bit slice is represented by attributes and wherein the step of determining specifies the action based on the attributes representing the first input bit slice and on the second input bit slice and the step of processing processes the attributes according to the determined action.

3. A method according to claim 2, the method further comprising the steps of defining from a first compressed bit slice the input attributes for the first input bit slice and defining from a second compressed bit slice the input attributes for the second input bit slice, the step of determining comprising the step of comparing the input attributes of the first input bit slice to the input attributes of the second input bit slice.

4. A method according to claim 3, wherein each compressed bit slice comprises a characteristic type indicator for indicating the characteristic type of each input bit slice represented by the compressed bit slice, the method further comprising the step of combining the characteristic type indicator for a first compressed input bit slice with the input attributes for the first input bit slice and for a second compressed input bit slice with the input attributes for the second input bit slice.

5. A method according to claim 3, wherein each compressed bit slice comprises a gender indicator for indicating the binary value of each input bit slice represented by the compressed bit slice, the method further comprising the step of combining the gender indicator for a first compressed input bit slice with the input attributes for the first input bit slice and for a second compressed input bit slice with the input attributes for the second input bit slice.

6. A method according to claim 3, wherein each compressed bit slice comprises a length indicator for indicating the length of each input bit slice represented by the compressed bit slice, the method further comprising the step of combining the length indicator for a first compressed input bit slice with the input attributes for the first input bit slice and for a second compressed input bit slice with the input attributes for the second input bit slice.

7. A method according to claim 2, wherein the input attributes for both the first input bit slice and the second input bit slice each comprise a characteristic type, the method further comprising the step of comparing the characteristic type for the first input bit slice to the characteristic type for the second input bit slice for determining the action.

8. A method according to claim 2, wherein the input attributes for each input bit slice comprises a gender for indicating the binary value of bits in the corresponding input bit slice, the method further comprising the step of comparing the gender for the first input bit slice to the gender for the second input bit slice for determining the action.

9. A method according to claim 2, wherein the input attributes for each input bit slice comprises a bit length, the method further comprising the step of comparing the bit length for the first input bit slice to the bit length for the second input bit slice for determining the action.

10. A method according to claim 1, wherein at least one of the input bit slices comprises an impulse, each such impulse comprising at least one contiguous binary bit of the same binary value followed by a binary bit of the opposite binary value at one end of the at least one contiguous binary bit and wherein the step of processing comprises the step of processing the impulse.

11. A method according to claim 1, wherein the step of determining specifies at least one resultant attribute for each resultant bit slice representing the resultant bit string.

12. A method according to claim 11, wherein the resultant attributes for each resultant bit slice comprises a characteristic type for indicating one of a plurality of characteristic types for the resultant bit slice, the step of processing comprising the step of determining the characteristic type.

13. A method according to claim 11, wherein the resultant attributes for each resultant bit slice comprises a gender for indicating one of a plurality of genders for the resultant bit slice, the step of processing comprising the step of determining the gender.

14. A method according to claim 11, wherein the resultant attributes for each resultant bit slice comprises a bit length for indicating a number of bits for the resultant bit slice, the step of processing comprising the step of determining the bit length.

15. A method according to claim 1, the step of processing comprising the step of performing a copy action on a plurality of the input bit slices in the bit string having the input bit slice with a shorter bit length.

16. A method according to claim 1, the step of processing comprising the step of performing a scan action on the longer input bit slice.

17. A method according to claim 1, the method further comprising:

determining whether a flip function is required based on the first input bit slice from the first bit string and on the second input bit slice from the second bit string; and performing, during the step of processing, the flip function on the first input bit slice or the second input bit slice when the flip function is required.

18. A method according to claim 1, the method further comprising:

determining whether a take function is required based on the first input bit slice from the first bit string and on the second input bit slice from the second bit string; and performing, during the step of processing, the take function on the resultant bit slice and on the first input bit slice or the second input bit slice when the take function is required.

19. A system comprising:

a relational database management system comprising:

a memory storing a plurality of bit strings, each representing organized data in the relational database management system and each divided into input bit slices:

means for performing a boolean operation on one of the bit strings to form a resultant bit string, the resultant bit string representing records in the relational database management system satisfying conditions of a query by a user, the resultant bit string divided into resultant bit slices;

means for determining an action according to the boolean operation based on a first input bit slice from a first bit string representing organized data in the relational database management system and on a second input bit slice from a second bit string representing organized data in the relational database management system;

means for selecting, from between the first input bit slice and the second input bit slice, the input bit slice with a longer bit length; and means for processing, according to the determined action, the longer input bit slice and a plurality of the input bit slices in the bit string having the input bit slice with a shorter bit length, for up to a number of bits in the bit string having the longer bit length to form at least one resultant bit slice for the resultant bit string satisfying the conditions of the user query.

20. A method comprising the step of:

using a computer to operate a relational database management system for efficiently processing a boolean operation on a pair of binary bit strings each represented by a series of binary bit slices, the binary bit strings representing organized data in the relational database management system, the boolean operation representing a function based on a query by a user, the step of using a computer further comprising the step of:

processing, according to the boolean operation, the pair of binary bit strings to form a resultant binary bit string represented by a series of resultant bit slices, the resultant bit string representing records in the relational database management system satisfying conditions of the user's query, comprising the steps of:

selecting, from between a pair of binary bit slices from each of the series of bit slices, the binary bit slice having a longer bit length; and performing the boolean operation on up to a number of bits in the binary bit string having the longer bit length to form at least one resultant bit slice for the resultant bit string satisfying the conditions of the user query.

21. A method according to claim 20, wherein each of the series of resultant bit slices further comprises a characteristic type, the step of performing further comprising:

comparing the pair of binary bit slices to determine a bit slice type represented by each of the series of resultant bit slices; and assigning the bit slice type to the characteristic type for each of the series of resultant bit slices.

22. A method according to claim 21, wherein the bit slice type represents either a run or an impulse, the step of assigning further comprising respectively assigning a run indicator or an impulse indicator to the characteristic type.

23. A method according to claim 20, wherein each of the series of resultant bit slices further comprises a gender, the step of performing further comprising:

examining the pair of binary bit slices to determine a binary value represented by each of the series of resultant bit slices; and assigning the binary value to the gender for each of the series of resultant bit slices.

24. A method according to claim 20, wherein each of the series of resultant bit slices further comprises a length, the step of performing further comprising:

examining the pair of binary bit slices to determine the length of each of the series of resultant bit slices; and assigning the length to each of the series of resultant bit slices.

25. A method according to claim 20, wherein each of the series of resultant bit slices further comprises a length, the step of transforming further comprising:

examining the pair of binary bit slices to determine the length of each of the series of resultant bit slices; and assigning the length to each of the series of resultant bit slices.

* * * * *